Oct. 3, 1933.  M. N. CASTRO  1,929,307
MECHANICAL SYSTEM
Filed Oct. 3, 1930
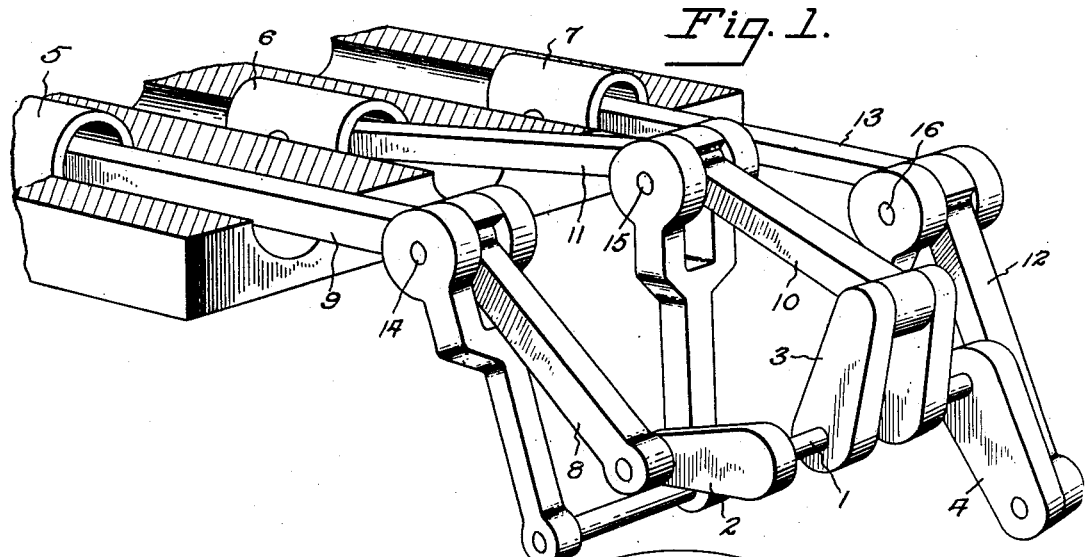
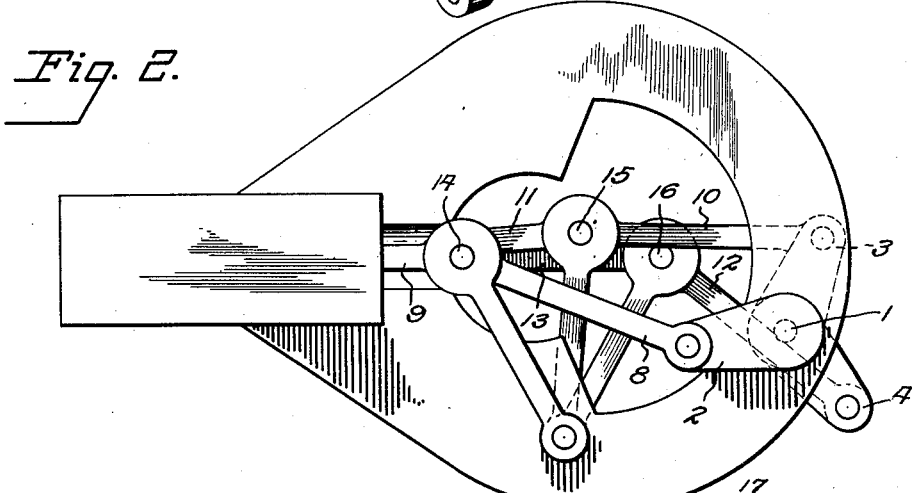
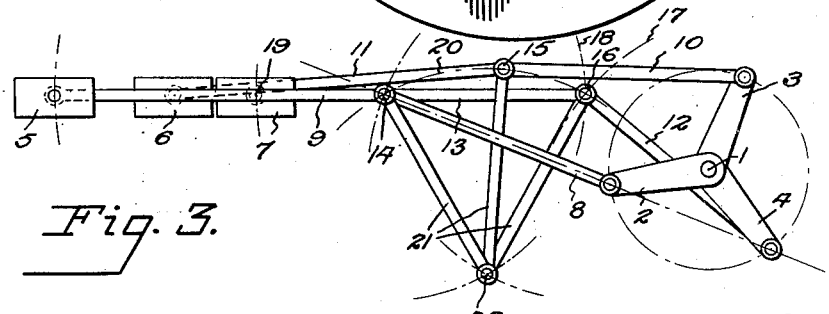
Inventor
M. N. Castro

Patented Oct. 3, 1933

1,929,307

UNITED STATES PATENT OFFICE 1,929,307

MECHANICAL SYSTEM

Manuel Noriega Castro, Mexico City, Mexico

Application October 3, 1930, Serial No. 486,231, and in Mexico October 5, 1929

1 Claim. (Cl. 74—14)

This invention is directed to a mechanical movement designed particularly for use in connection with a crank shaft and a piston whereby either may be utilized as the driver to operate the other, thus with the crank shaft as the driver turning rotary motion into rectilinear motion and with the piston as the driver turning rectilinear motion into rotary motion.

The invention is illustrated as a three-throw crank shaft, with the cranks 120° apart, and the piston rods intermediate the cranks and pistons made up of articulated members which at their joints are connected to a fixture by a link. The predetermined lengths of the link, articulated members and connections are such that the four points constituted by the crank shaft, the crank, the joint between the articulated members of the piston rod, and the piston can never be aligned in any relative position of the parts. Hence the possibility of dead centers and other objectionable results of such aligned condition are wholly and entirely obviated.

The invention is illustrated in the accompanying drawing, wherein:—

Figure 1 is a perspective view illustrating the application of the invention to a three-throw crank shaft and three cooperating pistons.

Figure 2 is a side elevation of the same.

Figure 3 is a diagrammatic view illustrating the means for determining the points of articulation of the articulated piston rods.

With particular reference to the drawing, the crank shaft 1 is shown with three cranks 2, 3 and 4 spaced apart 120°. To each crank is connected a piston, the respective pistons being indicated as 5, 6 and 7. Intermediate each piston and its crank is an articulated piston rod made up of two sections, the piston rod between crank 2 and piston 5 being made up of sections 8 and 9, the piston rod between crank 3 and piston 6 being made up of sections 10 and 11, and the piston rod between crank 4 and piston 7 being made up of sections 12 and 13. The points of articulation or connection between the sections of the respective piston rods are indicated at 14, 15 and 16 respectively.

In order to determine the exact position of the straight line or plane in which the pistons 5, 6 and 7 must move relative to the crank shaft in order to secure the result, the following procedure may be carried out. With particular reference to Figure 3, a line passing through the cranks 2 and 4 is prolonged any distance greater than the diameter of the circular plane of the cranks to determine the point 14. Then with the distance equal to the distance between the points 2 and 14 and centering at the crank 4, an arc is described, indicated at 17, and then with a distance equaling the diameter of the plane of movement of the cranks centered at point 14, the arc 18 is traced, intersecting the arc 17, and determining at the point of intersection the point 16. A line is then drawn through the points 16 and 14 and prolonged to determine the section 11, the prolongation, i. e. the section 11, when completed being conveniently larger than the distance between 14 and 16. Then with the piston end of section 11 as a center and with a distance equal to 14 and 16, the terminal of the section 13 is found at 19. The length of the sections 8 and 9 from crank 3 is determined by the same procedure, which need not be further described.

Now if by any mechanical system the point 14 of the articulated piston rods 2, 8 and 10, i. e. the joint 14, is forced to follow a straight line between the points 14 and 16 or the slight arc, indicated at 20, and terminating in these points, it follows that if pressure is applied to the piston connected at the end of the section 10, i. e. the piston 6, the point 14 will reach the point 16 at the same time that the crank 2 reaches the position of the crank 4 in the diagrammatic figure. Thus, the crank will describe an arc of 120°. In the line in which the pistons must move in relation with the center of the cranks in order that the joints 14, 15 and 16 may follow the straight line 7 or the slight arc, links 21 of the same length connected to a common axis 22 and respectively connected to the points 14, 15 and 16 are utilized. It is to be noted that the common axis 22 of the links 21 are on the opposite sides of the plane of movement of the pistons with respect to the crank shaft.

By the particular disposition of the lengths of the sections of the articulated piston rods and the mounting of the links on opposite sides of the plane of movement of the pistons relative to the crank shaft, it follows that the crank shaft 1, any crank, as 2, the point of articulation of the piston rod from that crank, as 15, and the plane of movement of the piston connected thereto, as 6, can never in any position of the crank shaft be aligned.

What is claimed as new is:—

The combination with a three-throw crank shaft, with the crank arms respectively spaced apart through 120°, articulated piston rods connected to the cranks, links connecting the articulations of the crank rods to a common axis, with the common axis of the links and the connection of the links to the articulations of the crank rods being respectively on opposite sides of the crank shaft, the links determining a substantially straight line movement of the articulated joint of the piston rods, whereby the points of any one connection determined by the crank shaft and particular crank and the point of articulation between the articulated piston rod connected to that crank and the piston-connected end of such piston rod can never be aligned.

MANUEL NORIEGA CASTRO.